R. VARLEY & W. W. MACFARREN.
POWER SYSTEM FOR AUTOVEHICLES.
APPLICATION FILED AUG. 15, 1911.

1,110,086.

Patented Sept. 8, 1914.
4 SHEETS—SHEET 1.

WITNESSES

INVENTORS
Richard Varley
Walter W. Macfarren
by Bakewell Keller
their attorneys

R. VARLEY & W. W. MACFARREN.
POWER SYSTEM FOR AUTOVEHICLES.
APPLICATION FILED AUG. 15, 1911.

1,110,086.

Patented Sept. 8, 1914.
4 SHEETS—SHEET 3.

WITNESSES

INVENTORS

UNITED STATES PATENT OFFICE.

RICHARD VARLEY, OF ENGLEWOOD, NEW JERSEY, AND WALTER W. MACFARREN, OF PITTSBURGH, PENNSYLVANIA, ASSIGNORS TO VARLEY DUPLEX MAGNET COMPANY, OF JERSEY CITY, NEW JERSEY, A CORPORATION OF NEW JERSEY.

POWER SYSTEM FOR AUTOVEHICLES.

1,110,086.  Specification of Letters Patent.  Patented Sept. 8, 1914.

Application filed August 15, 1911. Serial No. 644,252.

*To all whom it may concern:*

Be it known that we, RICHARD VARLEY and WALTER W. MACFARREN, both citizens of the United States of America, and residing, respectively, at Englewood, in the county of Bergen and State of New Jersey, and at Pittsburgh, in the county of Allegheny and State of Pennsylvania, have invented new and useful Improvements in Power Systems for Autovehicles, of which the following is a full, clear, and exact description, reference being had to the accompanying drawings, which form part of this specification.

In the use of automobiles propelled by internal combustion engines the necessity of "cranking" the engine to start the same is at times a considerable inconvenience, and various devices accordingly have been proposed for obviating the difficulty.

Our invention, subject of this application, aims to provide means for turning over or cranking the engine and in addition thereto means for the provision of light and ignition circuits. It may find embodiment, generally stated, in preferably the form of a single system or self-contained unit comprising a dynamo operatively associated with the engine, an accumulator in circuit with the dynamo, and lamp and ignition circuits adapted to be fed from the accumulator and also capable of being brought into circuit with the dynamo.

In the provision of means for starting the engine, lightness of weight and smallness and compactness of form with the maximum service efficiency has been obtained by our arrangement which employs a small motor having in its capacity as a motor a high starting torque which is transmitted to the engine shaft in a multiplied or compounded manner through the intermediary of, preferably, compound gearing.

The invention also provides for driving of the dynamo by the engine, so as to furnish current for the light and ignition circuits and to store energy in the storage battery or accumulator for subsequent utilization thereof to run the dynamo as a motor, to start the engine, and to feed the light and ignition circuits.

The improvement also consists, in combination with the elements of the system above set forth, of new and improved means for effecting regulation and control of the unit or system as a whole.

A further object of our invention is to provide other new and improved features of construction, as will be hereinafter more fully described.

We will now describe our invention, referring to the accompanying drawings, so that others skilled in the art to which it appertains may understand, construct, and operate the same. It will be premised, however, that various changes may be made in the construction and arrangement illustrated without departing from our invention.

All the main parts of our device are preferably contained in a cast frame or casing 2, which may be secured to or formed as a part of the casing of the engine 3, or may be carried by the chassis of the vehicle (not shown). This casing has a suitable cover 4 for convenience of access thereto. Journaled in each end of the casing 2, in suitable ball bearings 5, is the shaft 6 adapted to be brought into connection with the gearing 7 through the medium of suitable clutch mechanism 8. This gearing 7 comprises a spur gear 9 carried by the engine shaft and meshing with an idler 10 which in turn meshes with a gear 11 which has direct connection with the clutch 8. The gears may all be of the same size so that the rotation of the engine shaft will drive the shaft 6 at an equal speed when the engine operates to drive the dynamo.

Figure 1:
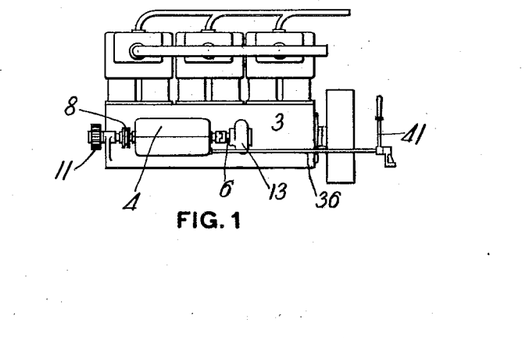
Figure 1 is a side elevation, partly diagrammatic of a combustion engine of autovehicle type, showing our invention as applied thereto.
Figure 2:
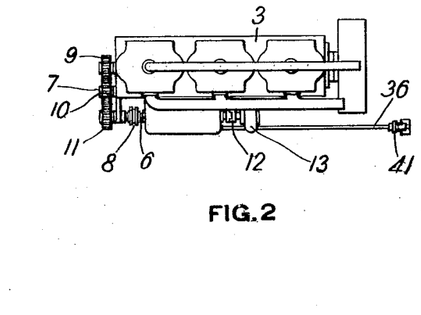
Fig. 2 is a top plan view of the same, this view also being partly diagrammatic.
Figure 3:
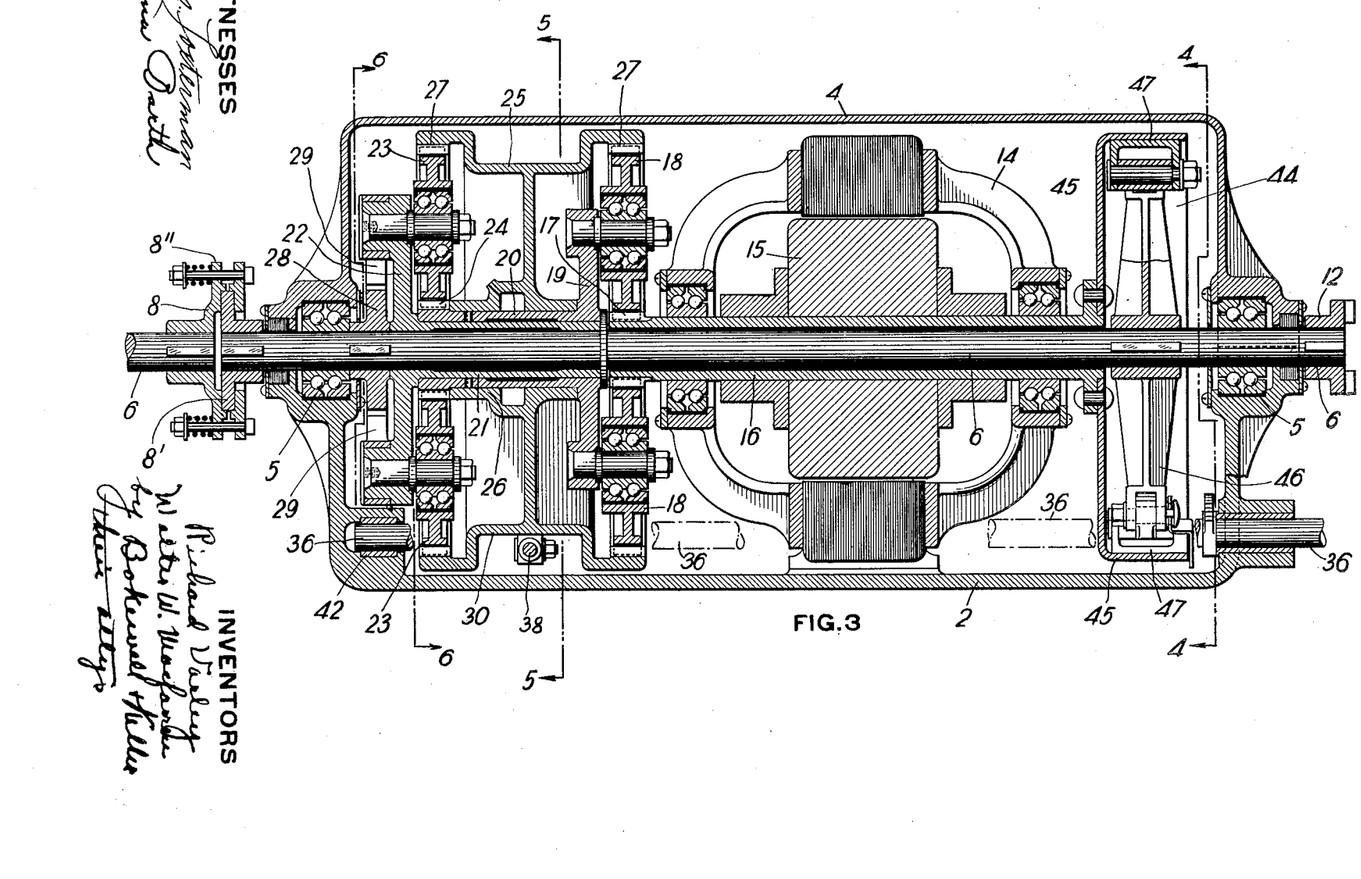
Fig. 3 is a vertical longitudinal sectional view through the dynamo element and its associated mounting and apparatus for bringing about operative connection thereof with the engine and for effecting its regulation and control.

It is obvious, however, that any other desired ratio of gearing may be employed. The clutch 8 maintains, preferably normally, connection of the shaft 6 with the engine 3 through the gearing described, and as such a clutch it preferably takes the form of a friction clutch which by reason of its capacity to yield will absorb and dissipate any severe shocks due to " back firing " of the engine, and thereby prevent its transmission to the dynamo and connecting apparatus, it being apparent that such reverse or backward shocks might otherwise injuriously affect such mechanism. In Figs. 1, 2 and 3 we show such a clutch mechanism. It comprises a flanged or disk-wheel 8' fixedly carried by the shaft 6 and retained in operative association with a cushioned clamp or friction element 8" in turn fixedly connected to the gear 11. The opposite end of the shaft 6 may carry a clutch element 12 for effecting connection thereof with the shaft of a fan, pump, or other mechanism 13 (Figs. 1 and 2). The dynamo 14 is mounted within the casing 2 and the armature 15 thereof is carried by the hollow shaft 16 loosely fitted on the shaft 6. A spur gear 17 carried by the shaft 16 meshes with a plurality of pinions 18 journaled on the spider or double armed member 19. The member 19 has the hub-like extension 20 loosely surrounding the hub 21 of a second spider or double armed member 22. This second spider 22 has loosely journaled thereon the plurality of pinions or second set of spur gears 23 which mesh with a gear 24 carried by the hub 20 of the member 19. The hub 20 is preferably formed in two interlocking parts for convenience in mounting the drum 25 the hub 26 of which is loosely journaled on this sleeve-like hub 20. Internal spur gears 27 are carried by the drum 25 and mesh with the pinions 18 and 23 thereby substantially completing a double planetary gear arrangement in operative association with the armature shaft 16. Fixed to the shaft 6 is a ratchet wheel 28 in engagement with which are the spring pressed pawls 29 pivotally carried by the spider 22.

Figure 5:
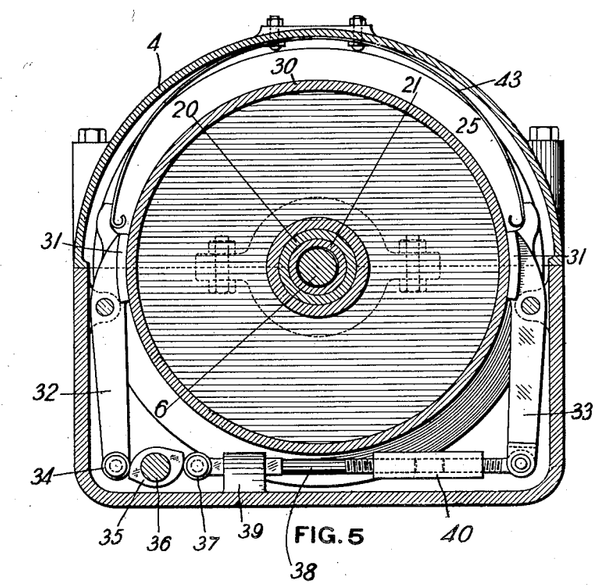
Fig. 5 is a similar view taken in the plane of line 5—5 of Fig. 3.
Figure 6:
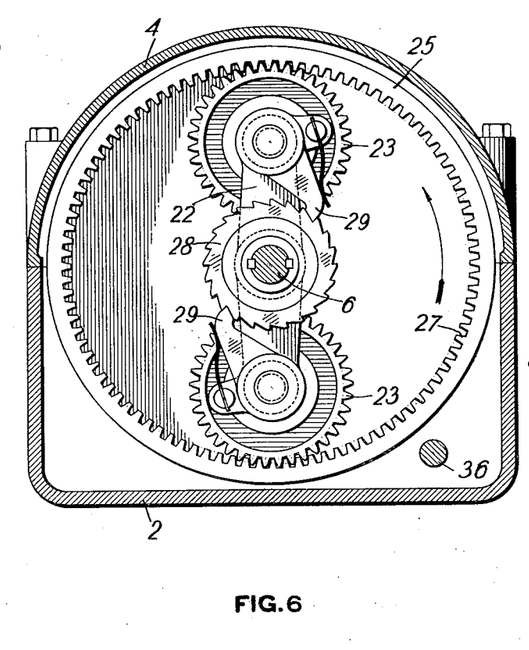
Fig. 6 is a similar view on the line 6—6 of Fig. 3.

The drum 25 has a braking face 30 preferably peripherally recessed so as to permit of the mounting within the smallest possible space the braking elements adapted to coöperate with the surface to hold the drum against rotation for the purpose to be hereinafter set forth. Referring to Fig. 5, it will be seen that the surface 30 is adapted to be engaged by a pair of oppositely disposed shoes 31 carried at the upper ends of a pair of levers 32 and 33 pivotally mounted in suitable lugs formed on the upright walls of the casing 2. The lever 32 carries the terminal roller 34 adapted to be engaged by a cam 35 upon the operating shaft 36. The lever 33 has like association with the cam 35 by means of a second roller 37 carried by a horizontally shiftable rod 38 which has at one end pivotal connection with the lever 33 and is non-rotatably journaled at the other end in a suitable bearing 39 of the casing 2. This rod 38 may be formed in two pieces and such pieces adjustably associated with one another by means of a threaded connecting sleeve 40. By mounting the cam 35 and bringing the levers 32 and 33 in relation therewith in the manner described enables the shaft 36 to be conveniently located along a corner of the casing. When it is desired to brake the drum 25 the operating shaft is rocked by shifting a suitable manual lever 41 fixedly carried thereby, so as to cause the cam 35 to act upon and force outwardly in opposite directions the rollers 34 and 37 with resultant shifting of the levers 32 and 33 and attending clamping of the shoes 31 upon the frictional surface of the drum. The operating shaft is held in this position until after the engine has started, by means of a suitable ratchet and pawl arrangement hereinafter described.

Figure 7:
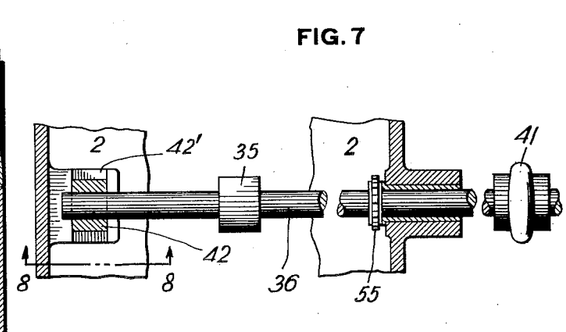
Fig. 7 is a fragmentary horizontal sectional detail view showing the pivoted rod or shaft of the controlling lever mounted in the casing of the dynamo and associated apparatus.
Figure 8:
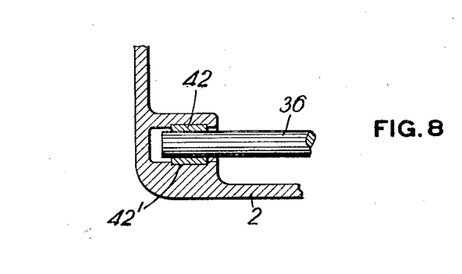
Fig. 8 is a vertical sectional view on the line 8—8 of Fig. 7, showing the terminal floating bearing for the shaft of the controlling lever.

In order to equalize the pressure on the brake shoes 31, the respective end of the shaft 36 is journaled in a floating bearing 42, shown in Figs. 3, 7 and 8. This bearing 42 is mounted within a suitable recessed portion or guide-way 42' in the end wall of the casing 2 in such manner as to be capable of only horizontal shiftable movement therein; said bearing being confined in and by means of the guide-way against vertical movement. The capacity to lateral yielding of the bearing 42 makes each roller 34 and 37 a fulcrum for the pressure of the cam 35 exerted upon the other roller. As this equalizing movement of the cam 35 is slight in amount only the respective terminal portion of the rod is mounted in the floating bearing, the opposite end of the rod or shaft 36 being carried in preferably a fixed bearing in the opposite end wall of the casing 2.

A flat or leaf spring 43 is fixedly secured at an intermediate point to the top of the casing 2 and curves downwardly in opposite directions, preferably uniformly, into terminal engagement with and exerts its pressure on the brake shoes 31 to hold them normally out of engagement with the drum 25. By securing the spring 43 to the casing 2 in the manner shown, each half of the spring exerts pressure on its respective brake shoe 31 independently of the other half and the other brake shoe.

From the above description it will be seen that if the drum 25 is held stationary by means of the braking mechanism and the gear 17 is rotated through rotation of the armature shaft 16 in driving of the dynamo as a motor, power will be transmitted to the shaft 6 through the double planetary gearing in the following manner: With the pinions 17 meshing with the pinions 18 said pinions 18 will travel around the internal gear 27 in mesh therewith and transmit power to the member 19 and gear 24. The gear 24 will in turn rotate the pinions 23 which rotation will, by reason of the fixed condition of the drum, cause them to travel around the internal gear 27. This travel of the pinions 23 sets up rotation of the spider 22 loosely journaled on the shaft 6, and by the rotation of this spider the ratchet wheel 28 is driven through the medium of the pawls 29 which normally positively lie in engagement with the ratchet wheel, thereby revolubly driving the shaft 6.

By reason of the large gear reduction the engine will be rotated at a very low speed just prior to starting thereof and the first few explosions in the cylinder may accelerate its speed with great rapidity, but as soon as the engine obtains from its own power a speed greater than that at which it is being driven by the dynamo through the gearing system above described, the spring pressed payls 29 overrun the ratchet being driven at the advanced speed, allowing the engine to "speed up" instantly any desired amount without effecting the gearing or dynamo.

In order to enable the engine to drive the dynamo to supply energy for the ignition, and lighting circuits and storage in the accumulator (to be hereinafter more fully explained), an automatic friction clutch 44 is provided for connecting the armature shaft 16 with the shaft 6 so that the dynamo may be driven in its generator capacity at engine speed. This clutch 44 consists of a light weight drum 45, preferably formed of sheet metal, fixedly attached to the shaft 16. Carried by a double armed member 46 fixed to the shaft 6, are friction shoes 47 (see Fig. 4), which are adapted to be forced by centrifugal action tightly against the inner circumferential face of the drum 44 when a moderate speed is obtained by the shaft 6, and thereby transmit power from the shaft 6 to the shaft 16.

It is obvious that various forms of centrifugally operated clutching mechanism may be employed in the association of the shaft 6 with the shaft 16, but the specific construction shown is preferable by reason of the fact that tight effectual gripping or clamping action is had through the employment of a very simple construction. In this construction the shoes 47 are shown as being indirectly carried by the double armed member 46 through the medium of curved lever arms 48 each of which is pivotally carried at one end by the member 46 and has at the opposite end the adjustably secured weight 49. The shoes 47 are carried by the arm 48 at a point near the pivotal point of connection of the arms with the member 46 so as to compound the leverage action of the weights 49, and interposed between the arms 48 and the member 46 are coiled contractile springs 50 which normally, in opposition to the tendency of the weights 49 to move outwardly, hold the lever arms 48 inwardly and the shoes 47 contracted from the face of the drum 44. Inward swinging or movement of the weights 49 may be limited by suitable stop lugs 51 carried by the member 46.

Figure 4:
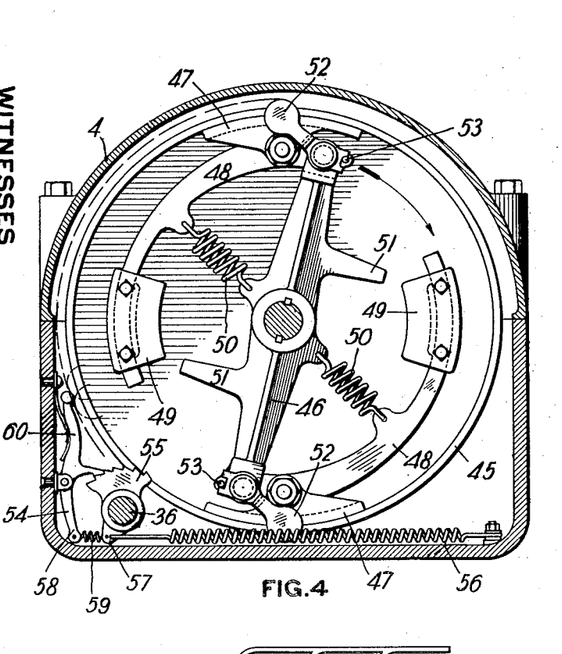
Fig. 4 is a transverse vertical sectional view on the line 4—4 of Fig. 3.

Referring to Fig. 4 it will be seen that the member 46 is provided with a pair of oppositely disposed pivotally journaled bob-weights 52 the outward swing of which through centrifugal force is adapted to be limited by means of stops or pins 53 carried by the member 46 and with which the weights 52 are adapted to engage. Pivotally mounted at one side of the casing 2, adjacent the operating rod or shaft 36 is a pawl 54 which engages through moderate spring pressure a ratchet 55 fixedly mounted on the shaft 36. A contractile spring 56 is anchored at one end to the casing 2 and connected at the opposite end to a depending finger or lug portion 57 carried by the ratchet 55, and between the lug 57 and the depending arm 58 of the pawl 54 is interposed a yieldable connection 59. The pawl 54 has a finger 60 extending upwardly and provided with a terminal ball or rounded head portion lying normally within the path adapted to be described by the bodies of the bob-weights 52 when centrifugally extended. Upon slow rotation of the shaft 6 the bob-weights 52 will wipe over the ball head without releasing the pawl 54, but upon the first explosion in the engine and resultant acceleration of the rotatory travel of the shaft 6, one of the bob-weights 52 will strike the ball head a displacement blow sufficient to release the pawl from engagement with the ratchet 55. The spring 56 will then immediately contract owing to the free condition of the ratchet 55, rotate the shaft 36 counter clockwise and thereby release, by the attending back action or return of the cam 35 to normal position, the brake shoes 31, and through the yieldable connection 59 swing the ball end of the pawl 54 out of the path of travel of the bob-weights 52. As the engine gains speed, the pressure of the clutch shoes 47 upon the clutch surface of the drum 44 will gradually increase to a point sufficient to effect rotation of the drum and thereby drive the dynamo and the connected planetary gearing. The rotation of the planetary gearing is without relative movement of one gear over another, by reason of the non-application of the braking mechanism to the drum 25. In this condition the dynamo, the drum 25, the drum 44 and all their contained and associated parts rotate as one piece, thus forming a construction and arrangement in which noise and wear is absent; features greatly to be desired in automobile construction.

From the above description it will be seen that power may be transmitted from the dynamo to the engine shaft through the reducing gearing and that the dynamo may be driven by the engine for generation of current, through the medium of the friction clutch automatically operated by the speed of engine.

*Electrical element and control.*—It is desirable that the means for making and breaking the electric circuits in their relationship to the dynamo element (said circuits to be hereinafter set forth) be coupled and operate in unison or synchronism with the manual mechanical control of the dynamo and associated parts. While this is one of the objects of our invention we do not, however, limit ourselves to such an arrangement, it being apparent that the electrical control and the mechanical control of the apparatus may each be capable of separate government.

Figures 9, 10:
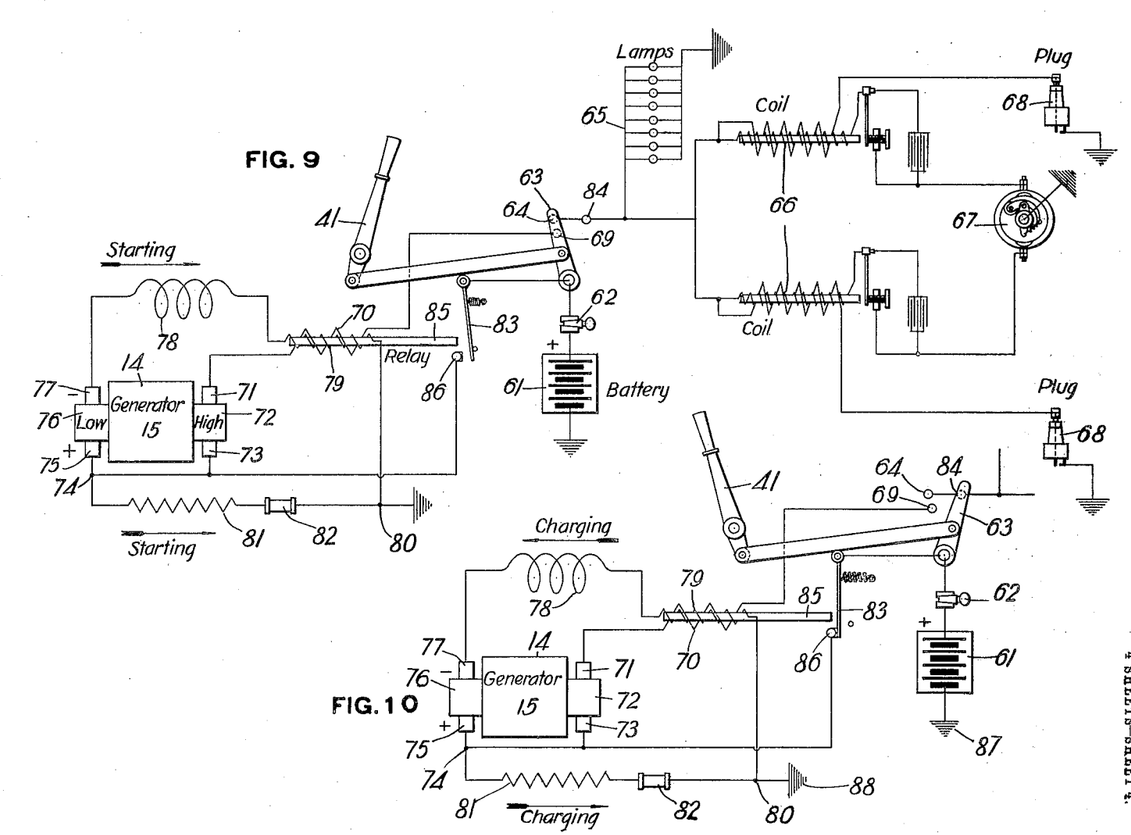
Fig. 9 is a diagrammatic view of the electrical circuits and connections of the system and in the condition assumed when the operating lever has been moved to starting position and the dynamo operates to turn the engine crank.
Fig. 10 is a similar view showing the condition of the electrical circuits and connections when the starting lever has been moved in a reverse position and the dynamo operates as a generator.

In the diagrammatic views of Figs. 9 and 10 are shown a light circuit, a coil or coil circuits in ignition capacity to spark plugs, an accumulator or storage battery, and suitable switch or controller means, all of which may be appropriately distributed throughout the vehicle, in combination with the dynamo component. The conditions outlined in Fig. 9 are those for feeding current to the dynamo for driving thereof, from energy which we will assume has been stored the battery 61 passes through a suitable plug the dynamo. In this case the current from the battery 61 passes through a suitable plug switch 62 to a switch lever or controller 63 which has operative insulated connection to the manual operating lever 41. The controller 63 makes connection with a contact 64 from which current passes to the lamp circuit 65 and through a ground connection back to the battery. Ground connections may be made in any suitable manner such as by grounding on the frame-work or chassis of the vehicle.

From the contact 64 a circuit is led to spark coils 66 to establish an ignition circuit leading to a suitable distributer 67 and spark plugs 68, through grounds, back to the battery 62. The dynamo 14 has connection with the battery 61 through the circuit leading from the controller 63 to a contact 69 and thence through the differential relay winding 70 to the brush 71, thence through the commutator 72 and through a "high" speed or torque winding in the armature 15 to the brush 73, then to the connection 74 where the current divides, part of it going to the brush 75 and the commutator 76, through a low speed or charging winding of the armature 15 to the brush 77. From this brush current passes to the series field winding 78 and the differential relay winding 79 to the connection 80 and then through a ground back to the battery. The parallel portion of the current leading from connection 74 passes through the shunt field winding 81, through a ground back to the battery. In circuit with the shunt winding 81 may be a suitable fuse 82 to protect the dynamo against destructive rise in voltage when that element is being driven by the engine.

It will be observed that the relay winding 70 and the winding 79 are opposed, the currents passing through in opposite directions so as to neutralize each other. As the full current passing to the brush 71 leads through the winding 70, and only a portion of the current returns through the finer winding 79 it is necessary to provide more coils or turns in the winding 79 than in the winding 70 so that these two windings may neutralize each other and thereby create no movement of the armature 83.

When the engine starts and the lever 41 is thrown to the left to non-braking position through the action of the centrifugal clutch and the spring 56, the lever or controller 63 is shifted thereby to the position shown in Fig. 10, in which condition the controller maintains the lamp circuit 65 through contact 84. In this Fig. 10 the lighting and ignition circuits have been omitted for the reason that their condition is the same whether the dynamo is running as a motor, or as a generator. Driving of the dynamo so as to rotate the armature 15 causes current to pass from the brush 75 through the shunt field 81, the connection 80, the fine relay winding 79, the series field winding 78 back to the brush 77, thus establishing a circuit which energizes the core 85 of the windings 70 and 79 and draws the armature 83 against the contact 86. No current passes through the commutator 72 or the relay winding 70 by reason of the break between the controller 63 and contact 69. The movement of the armature 83 into engagement with the contact 86 closes the circuit between the brush 75 and the controller 63 from whence current may flow through the battery 61 to ground connection 87, thence to ground connection 88 and through the relay winding 79, and the series field winding 78 back to brush 77. Current may also flow from the controller 63 to the contact 84 and through the lighting and ignition circuits and their ground connections back to the ground connection 88 and to brush 77.

It will be seen (Fig. 9) that in starting, the current in the series field 78 flows in the same direction as in the shunt field 81, so that these windings may be said to assist each other. In charging (Fig. 10) these windings are in opposition to one another and such condition causes the series field winding to operate against abnormal flow of current. As stated above the armature has a high and a low winding. That is, the "high" speed or torque winding is one having a greater capacity for speed by reason of the employment of more turns of winding than the low speed winding. These two windings assist each other when the dynamo is run as a motor, with the high winding connected to the commutator 72 producing a starting torque exceeding several times the torque which could be obtained from the low winding conected to the commutator 76.

The operation of the system will be clearly understood from the above description. The battery 61 is kept fully charged by the dynamo capacity when the engine is running. The light and ignition circuits may be at all times connected to the battery, receiving current from either of the contacts 64 and 84 when the plug switch 62 is connected. The capacity of the dynamo as a generator does not exceed the voltage of the battery. Under these conditions, if the battery should become disconnected destructive rising of the voltage would be prevented by the fuse 82, thus protecting the generator windings.

When the lever 41 is shifted to starting position as shown in Fig. 9 the mechanical elements are set in condition to drive the engine as previously described herein and electrical connections are made to operate the dynamo as a motor by current supplied from the battery or accumulator 61. After the engine has started under its own power, upon acquirement of moderate speed the lever 41 and associated electrical lever or controller 63 are automatically thrown over to the charging position; the geared connection between the dynamo and engine is thereby made inoperative and the centrifugal clutch automatically brings the dynamo to engine speed and holds it there as long as the engine is running. Any accidental shifting of the lever 41 to starting position while the dynamo is being driven by the engine, with resultant braking or partial braking of the drum 25 would be momentary by reason of the action of the bob-weights, and furthermore the centrifugal clutch 44 would slip so as to offset any braking action on the drum.

This gearing in itself forms subject matter of my application for United States Letters Patent, Serial Number 696,271, filed May 9, 1912, and I do not, therefore, claim the same in this application.

Having thus described our invention, what we claim and desire to secure by Letters Patent is:

1. In a power system, an engine, a dynamo, a battery, apparatus whereby said dynamo may actuate the engine, means for supplying through a circuit, energy from the battery to the dynamo, means for controlling said circuit connections between the battery and the dynamo, manual means for actuating said controlling means and for bringing the said apparatus into connection with the dynamo, mechanism for automatically effecting further movement of the manual means, and means for causing the engine to drive the dynamo and dependent for operation upon said last named movement of the manual means.

2. In a power system, an engine, a dynamo, a battery, apparatus whereby said dynamo may actuate the engine, means for supplying through a circuit, energy from the battery to the dynamo, means for controlling said circuit connections between the battery and dynamo, manual means for actuating said controlling means and for bringing the said apparatus into connection with the dynamo, mechanism for automatically effecting further movement of the manual means, and means for causing the engine to drive the dynamo, and dependent for operation upon the speed of the engine and upon said last named movement of the manual means.

3. In a power system, an engine, a dynamo, a battery in circuit with the dynamo, movable switch means for controlling the application of current from the battery to the dynamo, apparatus whereby the dynamo may actuate the engine, manual means for moving the switch means, means associated with the manual means, for bringing the said apparatus into operative connection with the engine, means automatically dependent upon the speed of the engine, for moving the manual means to a position to break the circuit for energizing the dynamo from the battery, and for bringing the said apparatus out of driving connection with the engine, and means whereby the engine may drive the dynamo.

4. In a power system, an engine, a dynamo, a battery, apparatus whereby the dynamo may actuate the engine, manual means for bringing the apparatus into operative connection with the dynamo and engine, movable switch means for effecting circuit connections between the battery and dynamo, and connected with the said manual means, whereby energizing of the dynamo by the battery is effected when the dynamo is connected to said apparatus, means for automatically moving the manual means to break said circuit connections and to disconnect the dynamo and said apparatus, and means whereby the engine may drive the dynamo.

5. In a power system, an engine, a dynamo, a battery, apparatus whereby the dynamo may actuate the engine, manual means for bringing the apparatus into operative connection with the dynamo and engine, movable switch means for effecting circuit connections between the battery and dynamo, and connected with the said manual means, whereby energizing of the dynamo by the battery is effected when the dynamo is connected to said apparatus, means for automatically moving the manual means to break said circuit connection and to disconnect the dynamo and said apparatus, means whereby the engine may drive the dynamo, and means associated with the switch means for establishing a charging circuit between the dynamo and battery.

6. In a power system, an engine, a dynamo, a battery, apparatus whereby the dynamo may actuate the engine, manual means for bringing the apparatus into operative connection with the dynamo and engine, movable switch means for effecting circuit connections between the battery and dynamo, and connected to the said manual means, whereby energizing of the dynamo by the battery is effected when the dynamo is connected to said apparatus, means for automatically moving the said manual means to break said circuit connections and to disconnect the dynamo and said apparatus, and means, dependent for operation upon the speed of the engine, whereby the engine may actuate the dynamo.

7. In a power system, an engine, a dynamo, a battery, apparatus whereby the dynamo may actuate the engine, manual means for bringing the apparatus into operative connection with the dynamo and engine, movable switch means for effecting circuit connections between the battery and dynamo and connected with the said manual means, whereby energizing of the dynamo by the battery is effected when the dynamo is connected to said apparatus, means for automatically moving the manual means to break said circuit connections and disconnect the dynamo and said apparatus, means, dependent for operation upon the speed of the engine, whereby the engine may actuate the dynamo, and means associated with the switch means for establishing a charging circuit between the dynamo and battery.

8. In a power system, an engine, a dynamo, a battery, a relay having opposing windings and provided with an armature, an armature for the dynamo, having separate high and low speed windings, controlling means for closing a circuit for supplying from the battery and through the windings of the relay, energy to the dynamo for operating the same as a motor, means for connecting the dynamo to the engine for driving of the latter, and means for operating the controlling means for breaking the motor circuit and deënergizing one of the windings of the relay, whereby the other relay winding shall move the relay armature to effect a closed circuit connection between the dynamo and battery and exclude the high winding of the dynamo.

9. In a power system, an engine, a dynamo, a battery, a relay having opposing windings and provided with an armature, controlling means for connecting in circuit winding of the relay, the battery and the dynamo, for operating the latter as a motor, means for connecting the dynamo with the engine, for driving the latter, means whereby the engine may actuate the dynamo and dependent for operation upon the speed of the engine, and means for operating the controlling means, for breaking the motor circuit and deënergizing one of the windings of the relay, whereby another relay winding shall operate to effect movement of the relay armature and closing of a circuit between the dynamo and battery.

10. In a power system, an engine, a dynamo, having high and low speed windings, means for connecting the engine and dynamo whereby each may actuate the other, a battery, means for bringing both windings into circuit with the battery, whereby the dynamo may actuate the engine, and means for bringing only a portion of said winding into service during driving of the dynamo by the engine.

11. In a power system, an engine, a dynamo, having high and low speed winding, means for connecting the engine and dynamo whereby each may actuate the other, a battery, means for bringing all of said winding into circuit with the battery, whereby the latter may operate the dynamo as a motor, and means, including a relay, for bringing a portion of said winding into service when the dynamo is driven by the engine.

12. In a power system, an engine, a dynamo, having high and low speed winding, means for connecting the engine and dynamo whereby each may actuate the other, a battery, a relay, means including a winding on the relay, for bringing all of the dynamo winding into circuit with the battery, whereby the latter may actuate the dynamo as a motor, and means, including said relay, for bringing a portion of said dynamo winding into charging circuit with the battery when the dynamo is actuated by the engine.

13. In a power system, an engine, a dynamo, having high and low speed winding, means for connecting the dynamo and engine whereby each may actuate the other, a source of current, means for bringing both windings into circuit with the source of current, whereby the dynamo may operate as a motor, and means for bringing only the low speed winding into generator service when the dynamo is actuated by the engine.

14. In a power system, an engine, a dynamo, having high and low speed windings, means for connecting the dynamo and engine whereby each may actuate the other, a source of current, means for bringing all of the windings into circuit with the source of current, whereby the dynamo may operate as a motor, and means for excluding the high speed winding during driving of the dynamo by the engine.

15. In a power system, an engine, a dynamo, having high and low speed windings, means for connecting the dynamo and engine, whereby each may actuate the other, a source of current, means for bringing all of the windings into circuit with the source of current, whereby the dynamo may operate as a motor, and means, including a relay, for excluding the high speed winding and for bringing the low speed winding into generator service when the dynamo is actuated by the engine.

In testimony whereof, we have hereunto set our hands.

RICHARD VARLEY.
WALTER W. MACFARREN.

Witnesses for Varley:
  M. A. KELLER,
  M. A. BARTH.
Witnesses for Macfarren:
  C. M. LAXTERMAN,
  HARRY L. DAY.